(12) United States Patent
Marcolin

(10) Patent No.: US 7,389,799 B2
(45) Date of Patent: Jun. 24, 2008

(54) ANTISTATIC HOSE FOR CONVEYING FLUIDS

(75) Inventor: Pietro Marcolin, Padua (IT)

(73) Assignee: Manifattura Tubi Gomma S.p.A., Grisignano di Zocco (Vicenza) (IT)

( * ) Notice: Subject to any disclaimer, the term of this patent is extended or adjusted under 35 U.S.C. 154(b) by 524 days.

(21) Appl. No.: 11/087,705

(22) Filed: Mar. 24, 2005

(65) Prior Publication Data

US 2005/0211328 A1    Sep. 29, 2005

(30) Foreign Application Priority Data

Mar. 25, 2004   (EP) .................................. 04425210

(51) Int. Cl.
*F16L 11/00*    (2006.01)

(52) U.S. Cl. .................. 138/137; 138/140; 138/DIG. 7; 428/36.91

(58) Field of Classification Search ................. 138/137, 138/140, DIG. 7, 143, 141; 428/36.91
See application file for complete search history.

(56) References Cited

U.S. PATENT DOCUMENTS

| | | | |
|---|---|---|---|
| 3,455,338 A | 7/1969 | Pollit .......................... | 138/178 |
| 3,825,036 A | 7/1974 | Stent ........................... | 138/174 |
| 5,106,538 A * | 4/1992 | Barma et al. ................. | 252/511 |
| 5,106,540 A * | 4/1992 | Barma et al. ................. | 252/511 |
| 5,391,432 A * | 2/1995 | Mitchnick et al. ............ | 428/357 |
| 5,743,304 A * | 4/1998 | Mitchell et al. .............. | 138/137 |
| 5,958,532 A * | 9/1999 | Krause et al. ................ | 428/36.3 |
| 6,528,137 B2 | 3/2003 | Franosch et al. ............ | 428/36.9 |
| 6,554,841 B1 | 4/2003 | Yang ........................... | 606/108 |
| 6,589,647 B1 * | 7/2003 | Ozawa et al. ................ | 428/327 |
| 2002/0006488 A1 | 1/2002 | Franosch et al. ............ | 428/36.9 |

FOREIGN PATENT DOCUMENTS

| | | |
|---|---|---|
| EP | 0 707 169 B1 | 4/1996 |
| EP | 0 999 396 B1 | 5/2000 |

* cited by examiner

*Primary Examiner*—Patrick F. Brinson
(74) *Attorney, Agent, or Firm*—Browdy and Neimark, PLLC

(57) ABSTRACT

An antistatic hose for conveying fluids with at least one conductive layer (2) comprising a first, conductive material (3) and a second, non-conductive material (4). The first, conductive material (3) forms a basic matrix and medium sized blocks (5) of the second, non-conductive material (4) are inserted in the basic matrix of first, conductive material (3). The first, conductive material (3) forms a continuous conductive path (6) extending along the entire length of the hose (1). The second material (4) is distributed in the matrix of first material (3) in an uneven and irregular way. The first material (3) preferably comprises a thermoplastic material to which particles of a conductive material have been added, whilst the second material (4) is thermoplastic.

19 Claims, 1 Drawing Sheet

ANTISTATIC HOSE FOR CONVEYING FLUIDS

TECHNICAL FIELD

The present invention relates to an antistatic hose for conveying fluids comprising at least one conductive layer, and preferably intended for the chemical/pharmaceutical and food sectors.

BACKGROUND OF THE INVENTION

At present various types of conductive hoses are known in which the conductive layer may be positioned either on the inside (in contact with the fluid conveyed) or on the outside (in contact with the external environment).

For example, patent EP 707 169 refers to a hose in which a conductive layer of plastic or elastomeric material covers an inner layer which forms the duct for the fluid, and in which a narrow electrically-conductive strip extends longitudinally along the hose. Moreover, said strip is at least partly in contact with the conductive layer and is homogeneously inserted in a spiral shape in the film which forms the inner layer.

Patent EP 999 396 refers to an antistatic hose with a wall made of elastomeric materials to which conductive particles are added. In this case the hose has a thin outer layer which is not conductive and which covers the conductive wall, except for a spiral portion.

However, the conductive hoses currently used have several disadvantages.

It should be remembered that the hoses are often used in systems together with moving parts. Therefore, the hoses have to be moved over the floor by dragging (in particular when hoses are full of product they are very heavy).

Despite the fact that in most applications the floors are smooth, hoses with an outer surface made of elastomeric material tend to wear due to friction. This phenomenon is particularly evident in the case of dark coloured hoses when they are dragged, leaving a coloured mark on the floor.

The wear phenomenon is aggravated by the fact that the elastomeric material adheres well to the ground, increasing friction.

This disadvantage is particularly problematic in those production environments (such as in the pharmaceutical and/or food industry) in which cleanliness is essential.

Moreover, hoses made of elastomeric material cannot resist all chemical attacks. As a result, the hoses should be used in environments in which they come into contact with a single product or with two or more products of a similar chemical nature.

Secondly, the use of elastomeric materials for hoses built on a mandrel, makes the hose difficult to clean, due to the fact that the surface is not smooth because of the cloth finish.

SUMMARY OF THE INVENTION

In this situation the technical need of the present invention is to provide an antistatic hose for conveying fluids which overcomes the above-mentioned disadvantages.

In particular, the technical need of this invention is to provide an antistatic hose for conveying fluids which guarantees not only sufficient conduction, but also a high level of resistance both to wear and to attack by chemical substances. The technical need of the present invention is also to provide an antistatic hose for conveying fluids which has a reduced external friction coefficient, facilitating dragging.

A further technical need of the present invention is to provide an antistatic hose for conveying fluids which is easy to clean.

The technical need specified and the aims indicated are substantially achieved by an antistatic hose for conveying fluids as described in the claims herein.

BRIEF DESCRIPTION OF THE DRAWINGS

Further characteristics and advantages of the invention are apparent from the detailed description which follows, with reference to the accompanying drawings, which illustrate preferred embodiments of the antistatic hose for conveying fluids by way of example and without limiting the scope of application, and in which.

DETAILED DESCRIPTION OF THE INVENTION

Figure 1:
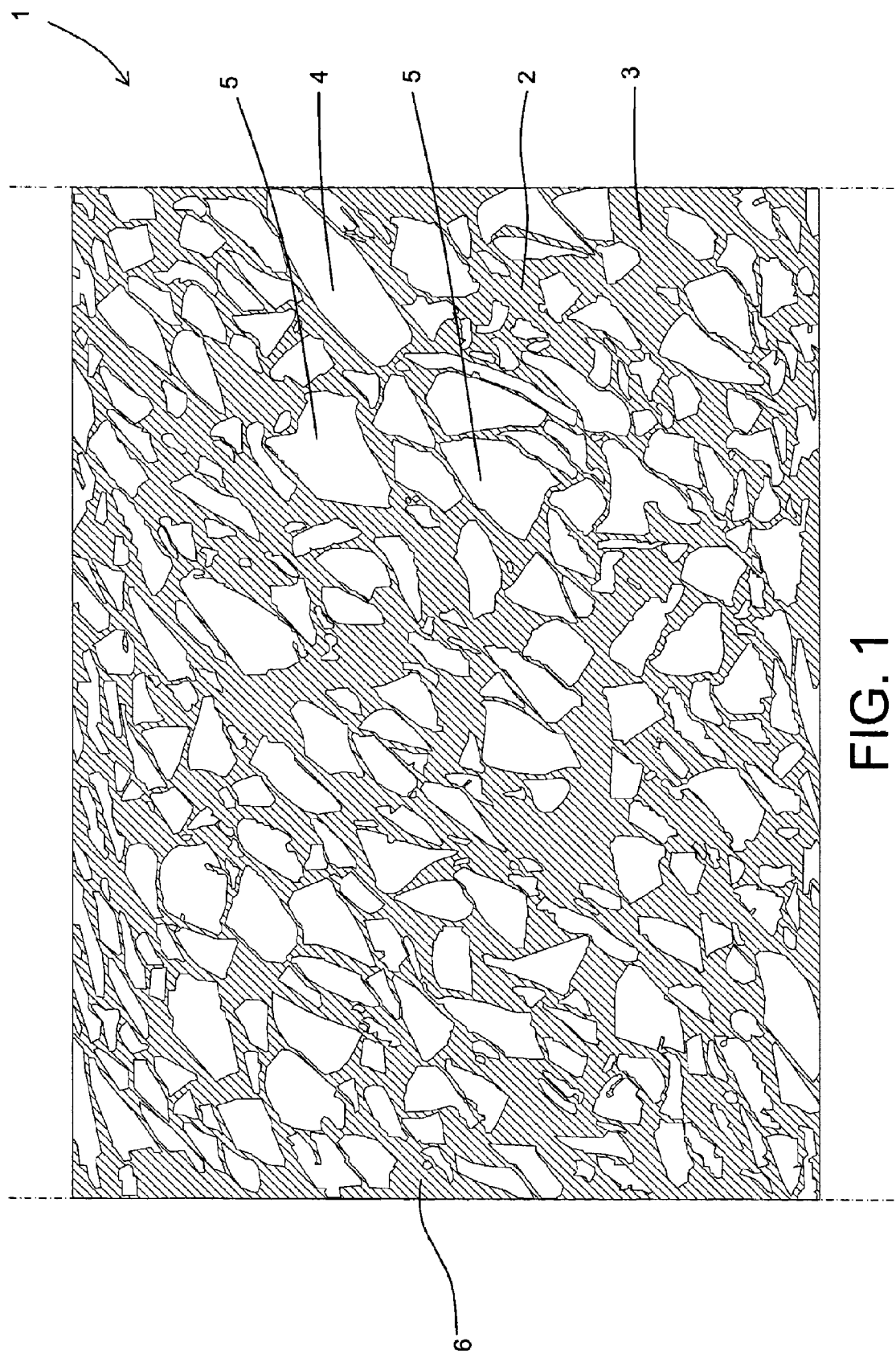
FIG. 1 is a side view of a section of hose which has an outer wall made in accordance with the present invention.

With reference to the accompanying drawings, the numeral 1 denotes as a whole an antistatic hose for conveying fluids according to the present invention.

The hose 1 has at least one conductive layer 2 comprising both a first, conductive material 3 and a second, non-conductive material 4.

The first, conductive material 3 forms a basic matrix in which medium sized blocks 5 of the second, non-conductive material 4 are inserted.

In this way the first, conductive material 3 forms a continuous conductive path 6 extending along the entire length of the hose 1.

At least one of the two materials 3, 4 (but advantageously both) is a thermoplastic material. In the case of the first material 3, conductive particles such as carbon black are added to the thermoplastic material.

In the preferred embodiment, the thermoplastic material is polyethylene, preferably with an ultra-high molecular weight (UPE).

In the embodiment illustrated, the first material 3 and second material 4 have different colours. In particular, the first material 3 has a dark colour approaching black (due to the presence of the carbon black), whilst the second material 4 has a light colour approaching white.

As illustrated in the accompanying drawings, the blocks 5 of the second material 4 form a plurality of isolated patches, unevenly distributed in the basic matrix consisting of the first, conductive material 3.

A similar distribution may, for example, be obtained with a process for formation of the conductive layer 2 (process preceding steps for production of the actual hose 1 which may occur with any known method, for example by working on a mandrel) which includes first the formation of an even layer of the first material 3, then the addition to this layer, during a calendering step, of medium sized blocks 5 of the second material 4. This step preferably takes place at a temperature corresponding to the softening point of the thermoplastic material so that the blocks 5 of the second material 4 can integrate and fuse with the first material 3 but without processes involving mixing of the two materials 3, 4.

The addition of the blocks 5 of the second material 4 occurs in an uneven way, but with a predetermined proportion relative to the first material 3.

In this way, in the resulting conductive layer 2, the second material 4 is distributed in the matrix of the first material 3 in an uneven and irregular way.

The production process may also be inverted (that is to say, adding the first material 3 to an even layer of the second material 4) provided that the proportions of the two materials 3, 4 are calculated appropriately.

Advantageously, the non-conductive material 4 represents more than 50% of the total material in the conductive layer 2.

Depending on the applications, the conductive layer 2 described above may be used to make the outer surface of the hose 1 (as illustrated in the accompanying drawings), to make the hose inner duct (not illustrated in the accompanying drawings), or for both.

To preserve the flexibility of the hose 1, the conductive layer 2 is less than 1 mm thick, and preferably less than 0.2 mm thick.

The present invention may be applied to any type of hose 1, whether a hose 1 made of rubber, a multi-layer hose 1 with or without textile and/or metal inserts, etc.

Finally, the hose 1 is preferably intended in particular for applications with fluids at medium-low pressures.

The present invention brings important advantages. Firstly, the antistatic hose for conveying fluids disclosed guarantees not only good conduction, but also a high level of resistance both to wear and to attack by chemical substances.

On one hand, if the outer surface is made of a plastic conductive layer as described above, since there is a low friction coefficient it is easier to drag over the ground, increasing its resistance to wear compared with hoses made with a basis of elastomeric materials.

Moreover, a conductive layer of plastic material of the type describe above, resistant to chemical attack, can allow on one hand use of the hose in environments with an aggressive atmosphere or in contact with any type of fluid, and on the other hand allows hose cleaning using any product without the risk of ruining it.

It should also be said that the present invention is relatively easy to produce and the cost of implementation of the invention is not very high. The invention described can be subject to modifications and variations without thereby departing from the scope of the inventive concept which characterises it.

All the details of the invention may be substituted by technically equivalent elements and all of the materials used, as well as the shapes and dimensions of the various components, may take any form according to requirements.

What is claimed is:

1. An antistatic hose for conveying fluids with at least one conductive layer (2) comprising a first, conductive material (3) and a second, non-conductive material (4), characterised in that the first, conductive material (3) forms a basic matrix and medium sized blocks (5) of the second, non-conductive material (4) are inserted in the basic matrix of the first, conductive material (3), the first, conductive material (3) thus forming a continuous conductive path (6) extending along the entire length of the hose (1).

2. The antistatic hose for conveying fluids according to claim 1, characterised in that the second material (4) is distributed in the matrix of the first material (3) in an uneven and irregular way.

3. The antistatic hose for conveying fluids according to claim 1, characterised in that the first material (3) comprises a thermoplastic material with added particles of a conductive material.

4. The antistatic hose for conveying fluids according to claim 3, characterised in that the thermoplastic material is polyethylene.

5. The antistatic hose for conveying fluids according to claim 3, characterised in that the thermoplastic material is UPE.

6. The antistatic hose for conveying fluids according to claim 3, characterised in that the particles of conductive material are particles of carbon black.

7. The antistatic hose for conveying fluids according to claim 1, characterised in that the second material (4) is thermoplastic.

8. The antistatic hose for conveying fluids according to claim 7, characterised in that the second material (4) is polyethylene.

9. The antistatic hose for conveying fluids according to claim 7, characterised in that the second material (4) is UPE.

10. The antistatic hose for conveying fluids according to claim 1, characterised in that the first material (3) and the second material (4) have different colours.

11. The antistatic hose for conveying fluids according to claim 10, characterised in that the second material (4) has a light colour and forms a plurality of isolated patches unevenly distributed in the basic matrix consisting of the first, conductive material (3), the latter having a dark colour.

12. The antistatic hose for conveying fluids according to claim 2, characterised in that the first material (3) and the second material (4) have different colours.

13. The antistatic hose for conveying fluids according to claim 12, characterised in that the second material (4) has a light colour and forms a plurality of isolated patches unevenly distributed in the basic matrix consisting of the first, conductive material (3), the latter having a dark colour.

14. The antistatic hose for conveying fluids according to claim 1, characterised in that the conductive layer (2) is less than 1 mm thick.

15. The antistatic hose for conveying fluids according to claim 1, characterised in that the conductive layer (2) is less than 0.2 mm thick.

16. The antistatic hose for conveying fluids according to claim 1, characterised in that the conductive layer (2) forms the outer surface of the hose (1).

17. The antistatic hose for conveying fluids according to claim 1, characterised in that the conductive layer (2) forms the inner duct of the hose (1).

18. The antistatic hose for conveying fluids according to claim 1, characterised in that the non-conductive material represents more than 50% of the conductive layer (2).

19. The antistatic hose for conveying fluids according to claim 2, characterised in that the non-conductive material represents more than 50% of the conductive layer (2).

* * * * *